April 4, 1939.  H. G. MILLER  2,152,906
BAND SAW GUIDE
Filed Aug. 12, 1936　　2 Sheets-Sheet 1
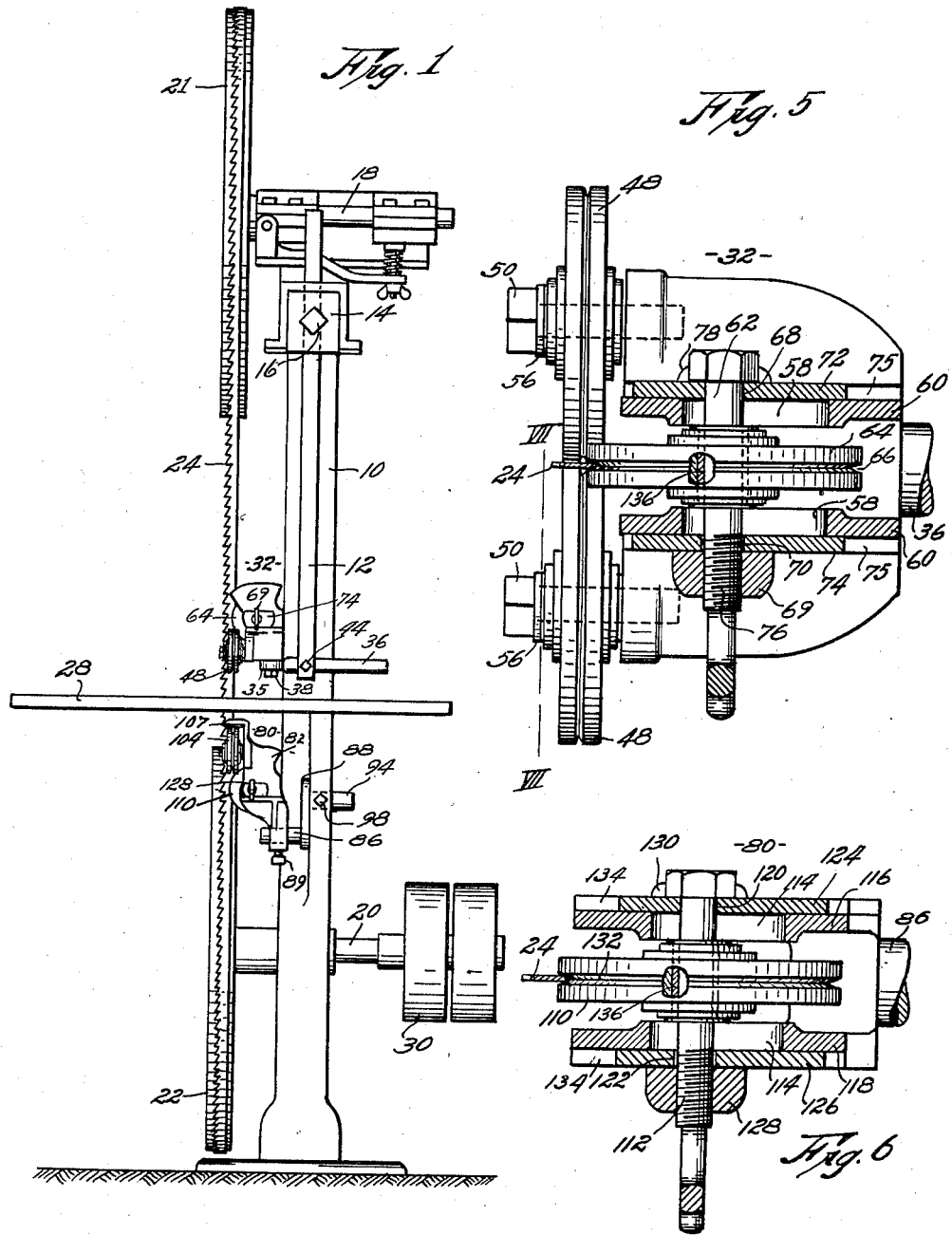
INVENTOR,
Harry G. Miller.
BY
Hovey & Hamilton,
ATTORNEYS.

April 4, 1939. H. G. MILLER 2,152,906
BAND SAW GUIDE
Filed Aug. 12, 1936 2 Sheets-Sheet 2
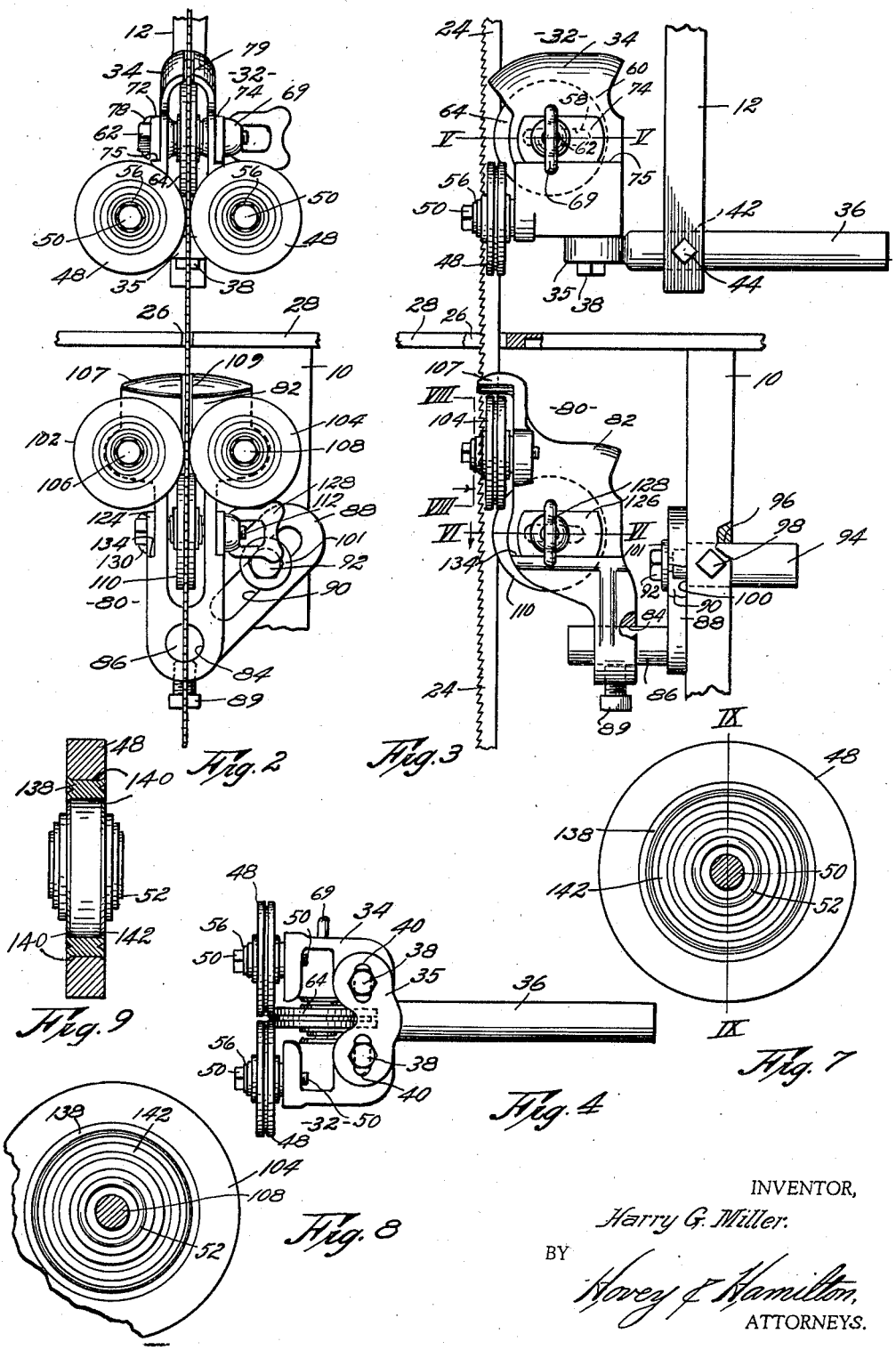
INVENTOR,
Harry G. Miller.
BY
Hovey & Hamilton,
ATTORNEYS.

Patented Apr. 4, 1939

2,152,906

UNITED STATES PATENT OFFICE 2,152,906

BAND SAW GUIDE

Harry G. Miller, Kansas City, Mo.

Application August 12, 1936, Serial No. 95,583

1 Claim. (Cl. 143—162)

This invention relates to improvements in band saw guides, and particularly to the type wherein the saw blade is maintained in proper alignment by means of rotatably mounted discs or rollers.

The principal object of this invention is the provision of a band saw guide which functions to support the sides and back of the saw blade both above and below the saw table, whereby a smooth and accurate running of the saw is obtained.

Another object of the present invention is the provision of a band saw guide having rollers adapted to engage the rear edge of the saw blade, that are easily adjustable to and from the saw, to accommodate saw blades of different widths.

Other objects are simplicity and sturdiness of construction, adaptability to band saws of different sizes and shapes, and durability and efficiency of operation.

With these and other objects, which will appear during the course of the specification, in view, reference will now be had to the drawings, wherein:

Figure 1 is a side elevation of a band saw, having a band saw guide thereon, embodying this invention.

Fig. 2 is an enlarged, fragmentary view of the band saw, showing the saw guide in elevation.

Fig. 3 is a side elevation of the parts shown in Fig. 2.

Fig. 4 is an inverted plan view of the top guide member.

Fig. 5 is an enlarged, sectional view, taken on line V—V of Fig. 3.

Fig. 6 is an enlarged, sectional view, taken on line VI—VI of Fig. 3.

Fig. 7 is an enlarged, sectional view, taken on line VII—VII of Fig. 5.

Fig. 8 is an enlarged, sectional view, taken on line VIII—VIII of Fig. 3, and,

Fig. 9 is a sectional view, partly in elevation, taken on line IX—IX of Fig. 7.

Throughout the several views, like reference characters designate similar parts, and the numeral 10 indicates the frame of a band saw of any of the well known types. A vertically adjustable guide post 12, mounted in arm 14 of the frame, is secured in any desired position by means of set screw 16. Mounted respectively on horizontally disposed shafts 18 and 20 are saw-carrying and driving wheels 21 and 22. An endless band saw 24, mounted on these wheels 21 and 22, passes through a slot 26 formed in table 28, which is carried by frame 10. Pulleys 30, respectively mounted on shaft 20, serve to drive wheel 22 and cause the saw to travel in one direction through the slot in the table on which the material to be cut is positioned. In order to obtain the best results with band saws of this type, it has been found that the saw blade should be guided adjacent the work, in order to cause the saw to run in a true line at all times, regardless of the type of work being done. Lateral movement of the saw adjacent the work is especially objectionable and should be avoided; also, edgewise movement of the blade, due to the thrust of the work, prevents accurate forming of the work.

Top guide member 32 comprises a housing frame 34, mounted for lateral adjustment on head 35 of stud 36 by means of machine screws 38 which pass through slots 40 formed in 35. Stud 36 extends through a socket 42 formed through the lower extremity of guide post 12 and is secured in position by set screw 44.

Mounted in alignment on spaced-apart axes 50 which are in a plane substantially parallel with the working plane of table 28, are rollers 48 that are adapted to be adjusted to respectively contact the opposite sides of the saw blade to prevent lateral movement thereof. Referring to Fig. 7, it will be noted that the machine screw axes 50, by means of which the roller 48 is secured to housing 34, is of a diameter less than the inside diameter of stationary portion 52 of the roller bearing 54. To facilitate proper positioning of the parts, a washer 56 is placed between the head of the machine screw 50 and member 52. With this construction, the rollers may be easily and quickly adjusted to saws of any thickness by simply loosening the machine screws and moving the rollers to position against the opposite ends of the blade and then again tightening the machine screws.

Horizontally disposed slots 58 formed through the side walls 60 of housing 34 above the axes 50 are adapted to receive the bolt axis 62 of thrust roller 64, which is disposed at right angles to rollers 48 and adapted to receive the rear edge of the saw blade 24 in a peripheral groove 66 formed therein. This groove 66 is preferably V-shaped so as to serve as a proper guide for the rear edge of the saw regardless of the thickness of the blade itself. Axis 62 passes through openings 68 and 70 respectively, formed through cover plates 72 and 74. The lower edges of plates 72 and 74 rest against ledges 75 formed in housing 34. The thread end 76 of 62 is provided with a thumb nut 69, while the head end is positioned between parallel ribs 78 to prevent accidental turning as the nut is being moved on the bolt. Housing 34 overhangs roller 64 and is provided with a slot 79 through which the saw blade 24 passes.

Below table 28, and carried by the frame, is a bottom guide member 80, comprising a housing 82, having a socket 84 adapted to receive a trunnion 86, carried by a plate 88. This trunnion is secured in fixed relation by means of set screw 89. An elongated slot 90, formed through 88, is adapted to receive a bolt 92, by means of which trunnion 94 is rigidly secured thereto. This trunnion is fitted through an opening 96 which extends through frame 10, and is secured in the operative position by means of set screw 98. Trunnion 94 is offset at 100, and a washer 101 is provided beneath the head of bolt 92, thus making it possible to readily adjust the housing 82 to any desired position.

Mounted for rotation on housing 82 is a pair of rollers 102 and 104 on horizontally disposed parallel axes 106 and 108 respectively. These axes are preferably in a plane substantially parallel with the plane of the table. Referring to Fig. 8, it will be noted that the axis 108 is smaller in diameter than the opening in the roller bearings, thereby permitting adjustment of the rollers to the proper position relative to the saw blade as described above. An overhanging ledge 107, slotted at 109 to receive the saw blade, serves as a protection for rollers 102 and 104 against an accumulation of saw dust, etc.

Positioned below and at right angles to rollers 102 and 104 is a thrust roller 110 which is rotatably mounted on bolt 112, mounted in horizontal slots 114 formed respectively in the side walls 116 and 118 of the housing. Bolt 112 passes through openings 120 and 122 formed through cover plates 124 and 126 respectively, and is provided at its threaded end with a thumb nut 128, and at its head end with retaining ribs 130. This thrust roller, when so mounted, may be moved toward and from the rear edge of the saw blade, which is adapted to be seated in the V-shaped peripheral groove 132. The plates 124 and 126 rest against ledges 134 formed in side walls 116 and 118. Referring to the assembled views, it will be observed that the single thrust rollers are at the top and bottom of the respective sets and are in opposed relation with regard to the tandem pairs of rollers, thus positioning the tandem rollers adjacent the table in both instances, to prevent the saw blade from flexing laterally, which is its tendency.

All of the rollers are constructed exactly alike and are interchangeable. However, the thrust rollers 64 and 110 are each provided with a bushing 136 to fill the space between the inside bore of the ball bearing member and the axes. The roller bearings which are of a grease packed, dust-proof type, are secured in the roller as clearly shown in Fig. 9 by means of an annular ring 138, expanded at its inner and outer edges 140 to hold the rotatable part 142 of the ball bearing in position. These rollers will function to guide the saw blade for a long period of time without further lubrication, and will eliminate many hazards and insure rapid and accurate cutting.

When the saw blade is at rest and in its desired position, the tandem rollers may be readily placed against the sides thereof to properly maintain it in definite alignment. The thrust roller is then moved to position the rear edge of the saw in the V-shaped groove formed in the periphery thereof.

Due to the fact that the opening 96 in the saw frame or parts carried thereby varies in position in different band saws, the adjustable mounting of housing 82 is provided which permits the mounting of the guide under all conditions.

Many minor changes might be made in the construction of this guide; however, it is desired to be limited only by the terms of the appended claim.

What I claim is:

In a band saw of the character described, a saw blade guide comprising a plate carried by the band saw frame and universally adjustable in a given plane; means for securing said plate in a predetermined position; a trunnion carried by said plate at a right angle thereto; a housing pivotally and slidably mounted for longitudinal movement on said trunnion; means for securing said housing against movement on said trunnion; a pair of rotatably mounted rollers on said housing adapted to respectively engage opposite sides of said band saw blade; a roller with its axis of rotation positioned at a right angle to the axis of said first named rollers adapted to engage the rear edge of the band saw; and means associated with each of said rollers whereby they are independently adjustable to and from said blade.

HARRY G. MILLER.